United States Patent
Duesler et al.

(10) Patent No.: US 8,240,043 B2
(45) Date of Patent: Aug. 14, 2012

(54) METHOD OF FORMING A WINDAGE COVER FOR A GAS TURBINE ENGINE THE METHOD INCLUDING FORMING A CONTINUOUS RING FROM A SHEET OF METAL AND BENDING AND CUTTING THE CONTINUOUS RING TO FORM AT LEAST TWO ARCUATE SEGMENTS

(75) Inventors: Paul W. Duesler, Manchester, CT (US); C. Vincent Loffredo, Newington, CT (US); Matthew D. Nicolson, Glastonbury, CT (US); Richard J. Pawlaczyk, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 103 days.

(21) Appl. No.: 12/655,022

(22) Filed: Dec. 19, 2009

(65) Prior Publication Data
US 2010/0172742 A1 Jul. 8, 2010

Related U.S. Application Data

(62) Division of application No. 11/449,900, filed on Jun. 10, 2006, now Pat. No. 7,635,251.

(51) Int. Cl.
*F01D 11/02* (2006.01)
(52) U.S. Cl. ............. 29/889.2; 29/412; 29/414; 29/425; 72/379.2; 72/379.6
(58) Field of Classification Search ................ 29/889.2, 29/412, 525.14, 414, 425, 463, 445; 72/379.2, 72/379.6
See application file for complete search history.

(56) References Cited

U.S. PATENT DOCUMENTS

| | | | | |
|---|---|---|---|---|
| 1,005,980 A | * | 10/1911 | Katzinger | ........................ 72/358 |
| 1,678,744 A | * | 7/1928 | Olsen | ........................ 29/890.149 |
| 1,710,930 A | * | 4/1929 | Klaus | ........................ 29/894.353 |
| 1,840,512 A | * | 1/1932 | Kling | ........................ 29/890.149 |
| 2,192,471 A | * | 3/1940 | Harbison | ................. 29/890.149 |
| 2,335,887 A | * | 12/1943 | Smith | ........................ 29/890.149 |
| 2,606,741 A | * | 8/1952 | Howard | ........................ 415/137 |
| 2,772,069 A | * | 11/1956 | Hockert et al. | ................ 415/134 |
| 3,018,085 A | * | 1/1962 | Welsh | ........................ 415/136 |
| 3,079,128 A | * | 2/1963 | Burge | ........................ 415/191 |
| 3,132,842 A | * | 5/1964 | Tharp | ........................ 416/191 |
| 3,827,133 A | * | 8/1974 | Mercier | ........................ 29/445 |
| 4,239,451 A | * | 12/1980 | Bouru | ........................ 415/173.7 |
| 4,285,633 A | * | 8/1981 | Jones | ........................ 415/191 |
| 4,295,785 A | * | 10/1981 | Lardellier | ................. 415/173.7 |
| 4,361,021 A | * | 11/1982 | McVay et al. | ..................... 72/71 |
| 4,395,195 A | * | 7/1983 | De Cosmo et al. | ........... 415/137 |
| 4,767,267 A | * | 8/1988 | Salt et al. | ................... 415/173.7 |
| 4,897,021 A | * | 1/1990 | Chaplin et al. | ............. 415/173.7 |
| 5,046,244 A | * | 9/1991 | Anreiter | ..................... 29/888.02 |

(Continued)

*Primary Examiner* — David Bryant
*Assistant Examiner* — Jason L Vaughan
(74) *Attorney, Agent, or Firm* — Gene D. Fleischhauer

(57) ABSTRACT

A stator assembly having a windage cover for structure adjacent to a cavity bounded by rotating elements in a rotary machine is disclosed. Various construction details are developed for damping vibrations in the windage cover as the windage cover bounds a cavity having swirling high velocity gases that are capable of transmitting acoustic energy and kinetic energy to adjacent structure. In one detailed embodiment, the windage cover in the uninstalled condition has diverging arms that are resiliently compressed during installation to exert a frictional force on the adjacent structure.

6 Claims, 8 Drawing Sheets

U.S. PATENT DOCUMENTS

| | | | | |
|---|---|---|---|---|
| 5,237,849 A * | 8/1993 | Miyazawa | | 72/335 |
| 5,561,999 A * | 10/1996 | Stevenson | | 72/337 |
| 6,042,334 A * | 3/2000 | Schilling | | 415/173.7 |
| 6,122,814 A * | 9/2000 | Pennig et al. | | 29/412 |
| 6,139,264 A * | 10/2000 | Schilling | | 415/174.2 |
| 6,340,339 B1 * | 1/2002 | Tabata et al. | | 475/5 |
| 6,409,472 B1 * | 6/2002 | McMahon et al. | | 415/189 |
| 6,499,945 B1 * | 12/2002 | Lathrop | | 416/198 A |
| 6,558,114 B1 * | 5/2003 | Tapley et al. | | 415/111 |
| 6,748,788 B2 * | 6/2004 | Yamano et al. | | 72/379.2 |
| 7,559,142 B2 * | 7/2009 | Patel et al. | | 29/889.2 |
| 7,635,251 B2 * | 12/2009 | Duesler et al. | | 415/173.7 |
| 2007/0283739 A1 * | 12/2007 | Kirchhof et al. | | 72/379.2 |

\* cited by examiner

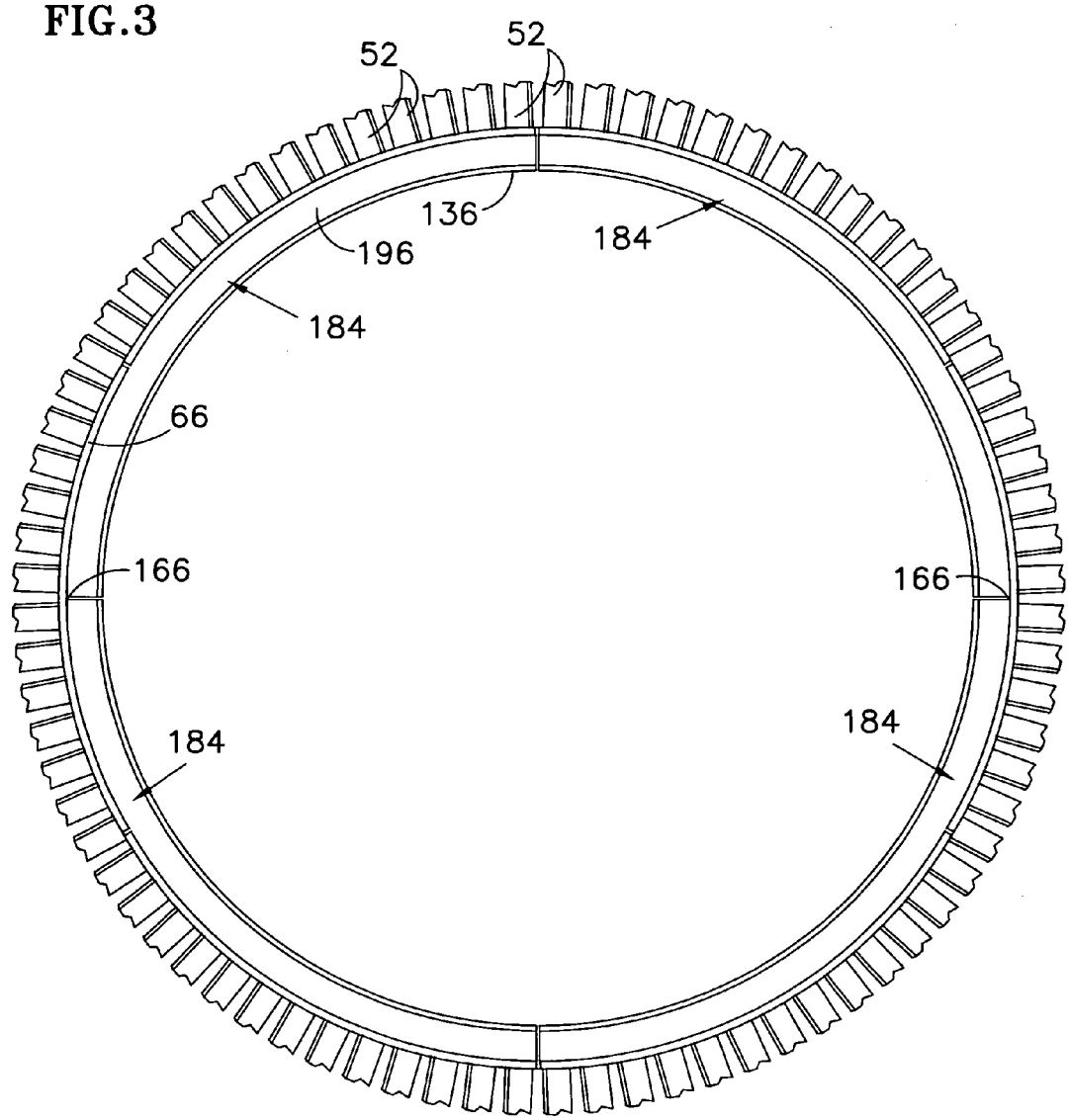

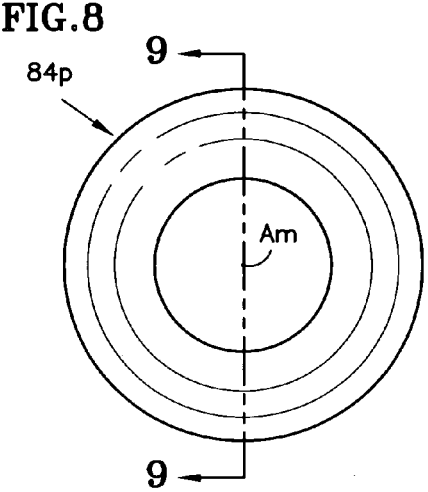
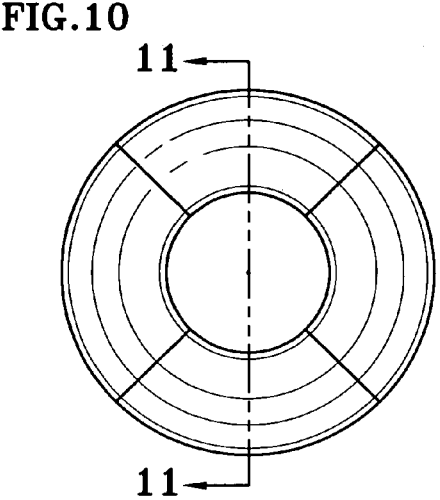
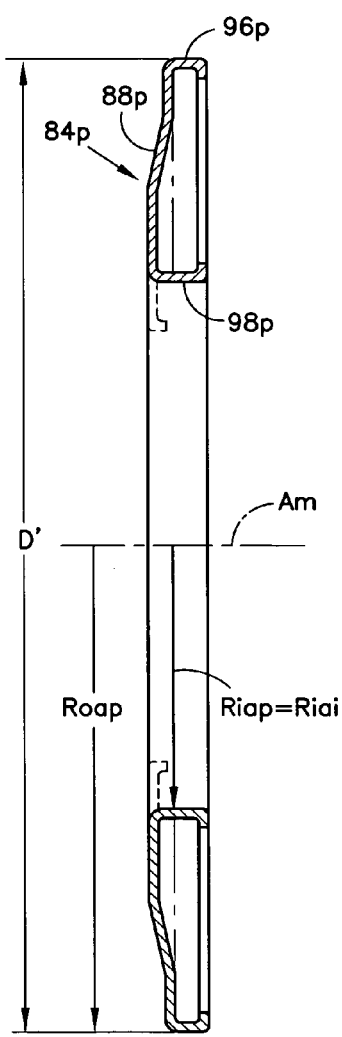
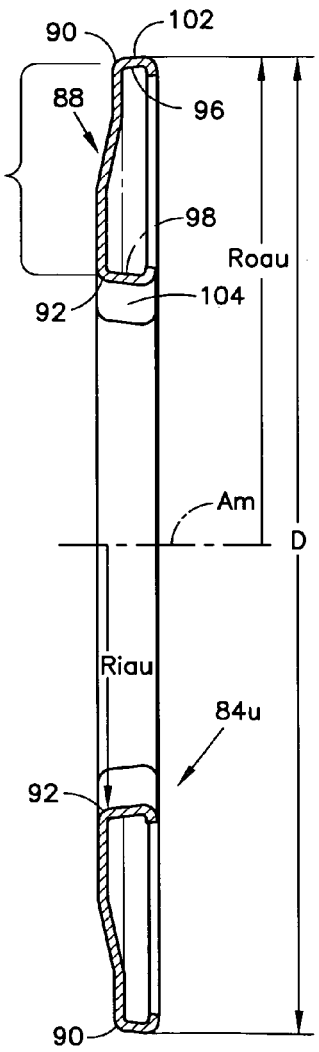

METHOD OF FORMING A WINDAGE COVER FOR A GAS TURBINE ENGINE THE METHOD INCLUDING FORMING A CONTINUOUS RING FROM A SHEET OF METAL AND BENDING AND CUTTING THE CONTINUOUS RING TO FORM AT LEAST TWO ARCUATE SEGMENTS

CROSS-REFERENCE TO RELATED APPLICATIONS

This application is a division of application Ser. No. 11/449,900 filed on Jun. 10, 2006, which issued as U.S. Pat. No. 7,635,251, and claims the benefit of the filing date thereof under 35 U.S.C. §120. This application incorporates by reference the specification including claims and drawing of the parent application.

BACKGROUND OF THE INVENTION

This invention relates to stator assemblies of the type used in rotary machines that have stator vanes, such as gas turbine engines. More particularly, this invention relates to structure for aerodynamically smoothing surfaces that bound a cavity extending between a rotor assembly and a stator assembly.

Rotary machines are used to transfer energy between a flow path for a stream of working medium gases and rotating elements inside the machine. There are many examples of such machines in widely disparate fields of endeavor.

Axial flow gas turbine engines for industrial purposes and for propelling aircraft are one example of such machines. These engines typically have a compression section, a combustion section and a turbine section disposed about an axis of rotation. An annular flow path for working medium gases extends axially through the sections of the engine. The gases are compressed in the compression section. Fuel is burned with the gases in the combustion section to add energy to the gases. The pressurized, hot working medium gases are expanded through the turbine section.

In the turbine section, the rotor assembly has a rotor disk and rotor blades that extend outwardly from the rotor disk. The rotor blades extend across the flowpath for working medium gases. Each rotor blade has an airfoil which adapts the rotor assembly to interact with the working medium gases. The rotor blades receive work from the gases flowing through the airfoils and drive the rotor assembly about the axis of rotation.

The rotor assembly transfers energy from the turbine section to the compression section. In the compression section, the rotor assembly has a rotor disk and rotor blades with airfoils that extend outwardly from the rotor disk. As the rotor assembly is driven about the axis of rotation, the airfoils do work on the entering gases to compress the gases, increasing the concentration of oxygen in the gases for burning fuel with the gases in the combustion section.

The engine includes a stator assembly disposed about the rotor assembly. The stator assembly has an outer case to bound the flow path and arrays of stator vanes which extend inwardly across the working medium flowpath. The arrays of stator vanes are disposed downstream and upstream of the adjacent arrays of rotor blades for guiding the gases to align the incoming gases with the downstream array of rotor blades and to reduce swirl imparted to the gases by the upstream rotor blades. This is important because swirl represents wasted kinetic energy.

The stator assembly includes an inner shroud assembly which is supported by the stator vanes. The shroud assembly includes a circumferentially extending seal land. The seal land is disposed radially about the rotating structure to block the flow off gases between the stator assembly and the adjacent rotor assembly.

The shroud assembly and vane support structure for the shroud bound circumferentially extending cavities that are inwardly of the flowpath. These cavities extend, for example, between the shroud assembly and the adjacent portions of the rotor assembly that carry the upstream and downstream arrays of rotor blades. The shroud assembly has irregular projections that extend into these cavities.

Working medium gases that leak from the flowpath fill these cavities. The rotor assembly bounding the cavity may rotate at ten thousand to twenty thousand revolutions per minute (10,000 20,000 rpm). As a result, the gases in the cavity are swept along by the boundary layer at the rotor assembly, reaching mean wind velocities that may exceed four hundred miles per hour (400 mph). (In comparison, the most severe hurricanes have wind velocities of two hundred miles per hour (200 mph) which will cause storm surges in oceans of eighteen (18) feet and may cause catastrophic building failures.)

These winds are gases dragged along by the rotor assembly and constantly take energy from the rotor assembly, and then lose this energy to the stator assembly by doing work on the adjacent structures through friction forces and by slamming into the irregular surfaces extending into the cavity. This type of work is typically called "paddle-wheel work" or "stirring work.". The energy is transformed from the useful kinetic energy of rotation into heat, uselessly heating the gases and adjacent structures by several hundred degrees, and decreasing the efficiency of the engine. This may require the use of heavier and more expensive materials more forward in the engine than would otherwise be required if the mass of such swirling gases could be reduced.

One solution is to provide aerodynamically smooth surfaces adjacent to the high-speed wind cavities. These surfaces reduce the drag of the stator structure on the winds, and thus the need to constantly supply energy to the winds, by masking the winds from the irregular surfaces in the cavity. However, the structures add weight to the engine, which reduces engine efficiency. One possibility is to reduce the level of added weight by providing relatively lightweight structures that will provide smooth aerodynamic contours to surfaces adjacent the wind cavities. But then another problem arises because of the dose proximity of the rotor assembly to the stator assembly and to any structure provided to stator assembly.

For example, as the rotor blades pass by each stator vane, each stator vane and the adjacent shroud structure experience pressure pulses from each passing rotor blade. As the rotor blades pass the stator structure, the stator structure is struck by a pressure rise from the passing pressure side of the rotor blade and experiences a pressure drop from the passing suction side of each rotor blade. A similar phenomenon occurs as each rotor blade passes the suction side and pressure aside on each stator vane. These pressure pulses take the form of significant acoustic energy which slams into the structure of the adjacent stator assembly and causes significant vibrations in these structures. As a result, experience has shown that destructive vibrations can occur in the adjacent structure and that such structures must be relatively strong (with a concomitant increase in weight) to withstand the severe winds and acoustic energy adjacent these cavities.

Accordingly, scientists and engineers working under the direction of Applicants' assignee have sought to develop relatively lightweight structures that will provide aerodynamic smoothness to structures that are adjacent to rotor-stator cavities and that have sufficient durability to exist in that severe environment.

BRIEF SUMMARY OF THE INVENTION

This invention is in part predicated on the realization that relatively lightweight structures may be used to bound a rotor-stator cavity provided that such structures provide significant damping to themselves to avoid destructive vibrations in the structures. In one embodiment, it is predicated on recognizing that aerodynamically smooth structure might employ both coulomb friction damping and viscous damping if the structure is thin enough to deflect in response to pressure pulses from acoustic energy and from winds in the cavity.

According to the present invention, a circumferentially extending annular member, such as a vane shroud, has a pair of damping surfaces spaced one from the other adjacent to a circumferentially extending cavity in the shroud, the cavity having an upstream side and a downstream side, and further includes a windage cover for covering the cavity having at least two circumferentially extending segments of a ring, each segment having a cross-section formed by a circumferentially extending base, the base having sides which extend circumferentially about the base and two arms, each attached to one of the sides that are substantially perpendicular to the base, the arms being angled one to the other in the uninstalled condition, and being deflected with respect to each other in the installed condition by engagement with the damping surfaces such that the arms press against the damping surfaces with a force that causes coulomb damping at the damping surfaces.

In accordance with one embodiment of the present invention, the segment of the windage cover has a channel-like (or U-shaped cross-sectional shape) the arms diverging from one from the other in the uninstalled condition such that they are compressed toward each other in the installed condition by engagement with the damping surfaces.

In accordance with one detailed embodiment of the present invention, the damping surfaces are spaced radially and face each other, the base extends circumferentially and radially to cover at least one side of the cavity, and the arms extend in a generally axial direction to engage the radially facing damping surfaces and position the covering base over the cavity.

In accordance with another embodiment of the present invention, the damping surfaces are spaced axially and face each other, the arms extend in a generally radial direction to engage the axially facing damping surfaces to cover the upstream side of the cavity with one arm and the downstream side of the cavity with the other arm, and the base extends circumferentially and axially, to position the covering arms over the cavity.

According to the present invention, the method of forming the arcuate segments of the ring includes forming a ring from a sheet of annular material extending about and perpendicular to an axis Am, the sheet having an inner diameter edge and an outer diameter edge; bending the inner diameter edge and a portion of the ring adjacent to the inner diameter edge more parallel to the axis Am such that the ring has an annular inner flange at the inner diameter and a rim which extends from the flange to the outer diameter edge, the inner flange being substantially perpendicular to the rim and parallel to the axis Am; cutting the ring to form at least two arcuate segments; wherein the stresses induced in the ring by the forming process cause each segment to have a slightly greater radius of curvature than the ring and causes the rim and the flange of the segment to be angled more with respect to the axis Am, and diverge more away from each other as the arms extend from the ring than did the arms of the ring.

In accordance with one detailed embodiment of the method, the sheet of material for the method is relatively flat. The term "relatively flat" as used herein means that, prior to forming the flange, the elevations of one part of the surface of the sheet with respect to other parts of the surface are less than twice the height of the flange.

In accordance with one detailed embodiment of the method, the method includes bending the outer diameter edge and a portion of the ring adjacent to the outer diameter edge more parallel to the axis Am such that the ring has an annular outer flange and the rim extends from the inner flange to the outer flange, the flanges being substantially perpendicular to the rim and parallel to the axis Am;

In accordance with one detailed embodiment of the method, the ring is a first ring and prior to cutting the first ring, the method includes forming a second ring in the same fashion as the first ring, the second ring having a greater diameter than the first ring; and disposing the rings about the axis Am such that the inner flange of the second ring is spaced radially from the inner flange of the first ring leaving an annular channel therebetween; forming the third and fourth rings in the same fashion as the first and second rings with flanges adapted to face the flanges on the first and second rings; disposing the third and fourth rings about the axis Am such that all rings have the same axis Am and the annular channel on the second ring axially faces the annular channel on the first and second rings; disposing a circumferentially extending base member about the axis Am which engages the inner surface of the first flange of the first ring and the first flange of the third ring; attaching the first and second rings together; attaching the third and fourth rings together; attaching the base member to the inner flange of the first and third rings; cutting the first, second, third and fourth rings and the base along a plane containing the axis Am.

A primary feature of the present invention is a windage cover which extends circumferentially about a stator assembly to reduce the size of a circumferentially extending cavity bounded on one side by the stator structure and which is adjacent to rotating structure. Another primary feature is the segmented nature of the windage cover. In one embodiment, each segment has a greater radius of curvature in the uninstalled condition than in the installed condition. Another feature is the cross-sectional shape of the windage cover which has a base and two arms which are deflected at installation to exert a damping force against adjacent structure. In one embodiment, the base extends circumferentially to cover a side of the cavity. In another embodiment, a pair of axially spaced arms extend from the base, and each of the arms extends radially and circumferentially to cover an associated side of the cavity. In one particular embodiment, a feature is seal land structure which is attached to the base of the windage cover. In one embodiment, a feature is using sheet metal to form the windage cover, the sheet metal being relatively thin compared to the area of the windage cover and the radial height of the windage cover.

A feature of the method of forming the windage cover is the step of attaching circumferentially continuous rings together to form a circumferentially continuous precursor to the windage cover prior to cutting the windage cover to form the segments of the windage cover.

A principal advantage of the present invention is the efficiency of the rotary machine which results from reducing aerodynamic losses from swirling gases by bounding a cavity in the stator structure with a windage cover. Still another advantage is the durability of the windage cover which results from decreasing vibrational stresses in the windage cover by damping vibrations in the windage cover. In one particular embodiment, the damping of vibrations results from using both coulomb friction and viscous friction to damp vibrations in the windage cover. In one detailed embodiment, damping by viscous friction results from forming the windage cover of relatively thin sheet metal material which permits deflections of the walls of the windage cover in response to operative forces from gases in the cavities adjacent to the windage cover. In one detailed embodiment, an advantage of the method is the cost and weight of the windage cover which results from using material which may be bent, such as sheet metal material, to form the windage cover precursor and to form the windage cover precursor as a continuous ring prior to cutting the precursor to form the segments of the windage cover. In one detailed embodiment, an advantage is the durability of the rotary machine which results from trapping, with the windage cover, structure that might become loose in the cavity bounded by the windage cover. (An example of such structure is a nut and bolt fastener.) An advantage of the windage cover which is produced by the process of attaching, continuous rings prior to cutting the precursor to the windage cover is the efficiency of the rotary machine which results from the circumferential alignment of adjacent circumferential structure of the segments in the installed condition. In one particular embodiment, an advantage of the windage cover which is produced by the process is the alignment of adjacent seal land segments in the installed condition which are attached to the segments of the windage cover.

The foregoing features and advantages of the present invention will become more apparent in light of the following detailed description of the invention and the accompanying drawings.

BRIEF DESCRIPTION OF THE SEVERAL VIEWS OF THE DRAWING

FIG. 3 is a simplified cross-sectional view taken perpendicular to the axis of rotation Ar with elements of the compression section broken away for clarity to shows four segments of the windage cover 184 and four segments of the seal land 136 that are attached to the windage cover 184.

FIGS. 4-12 relate to a method of forming the windage covers 84, 84d, 184.

FIG. 4 shows a front view of a sheet of annular material extending about and perpendicular to an axis Am that forms a ring precursor to an annular windage cover;

FIG. 5 is a cross-sectional view taken along a line 5-5 of FIG. 4 with phantom lines showing a portion of the sheet of material prior to bending the portion of the sheet;

FIG. 6 is a view corresponding to the view shown in FIG. 4 of a ring of a windage cover and shows the effect of cutting the ring of the windage cover into segments.

FIG. 7 is a view corresponding to the view shown in FIG. 5 showing a continuous ring after the step of cutting the continuous ring into four segments and shows the effect of cutting the continuous ring.

FIG. 8 is a front view of an annular windage cover precursor 84p extending about and perpendicular to an axis Am.

FIG. 9 is a cross-sectional view taken along a line 9-9 of FIG. 8 with the phantom lines showing a portion of the sheet prior to bending the portion of the sheet;

FIG. 10 is a view corresponding to the view shown in FIG. 8 of the completed windage cover 84;

FIG. 11 is a view corresponding to the view shown in FIG. 9 and is taken along the line 11-11 of FIG. 10 showing the completed windage cover after the step of cutting the precursor windage cover into four segments;

FIG. 12 is a partial perspective view of the windage cover precursor 184p for the windage cover 184 showing the precursor as a complete ring prior to cutting the precursor into four segments; the ring is sectioned and is partially broken away and shown without sectioning lines for clarity to show the attaching material.

DETAILED DESCRIPTION OF THE INVENTION

Figure 1:
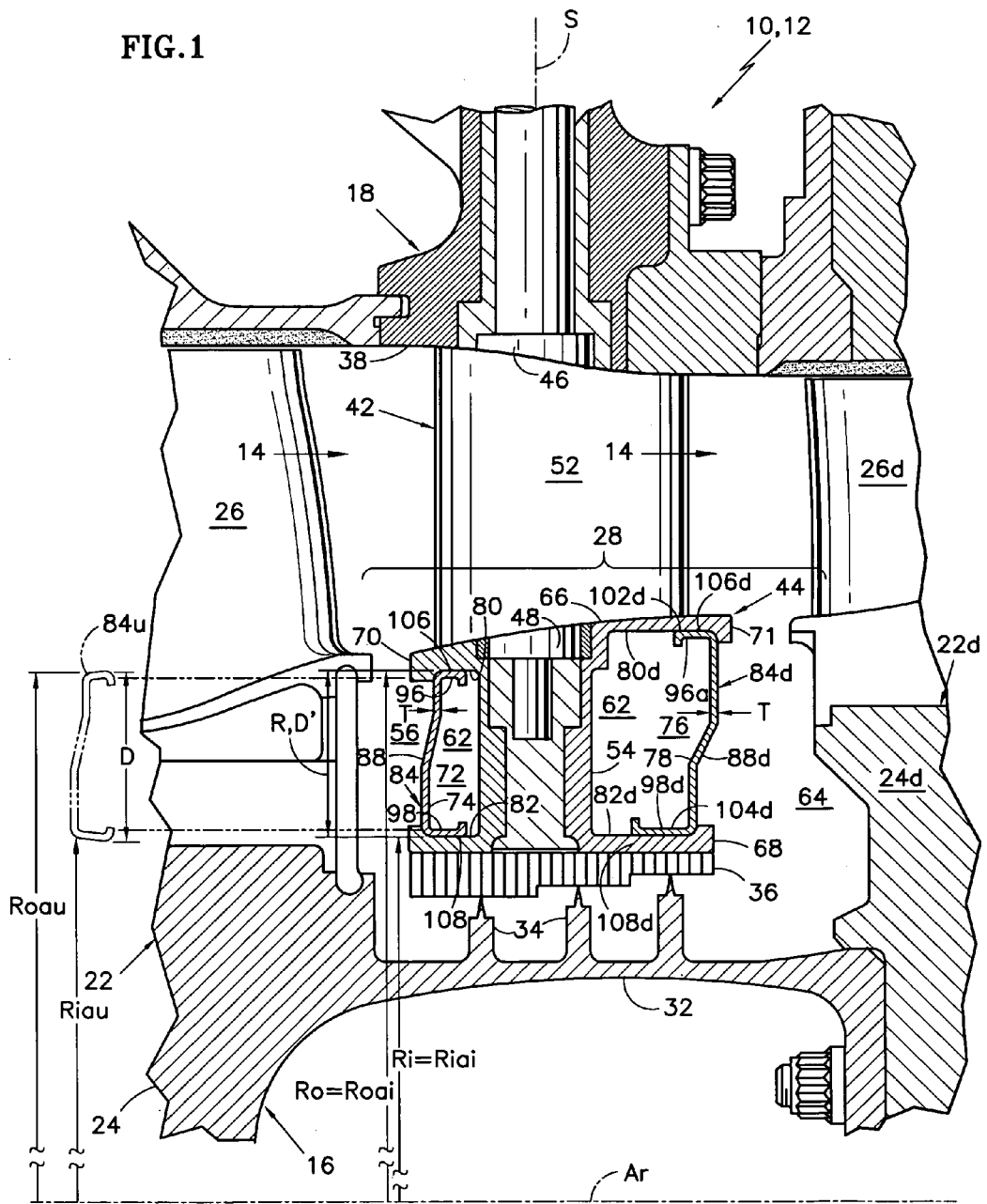
FIG. 1 is a side elevation, cross sectional view of a rotary machine 10, such as a gas turbine engine, having a compression section 12 which is partially broken away for clarity.

FIG. 1 shows is a side elevation, cross sectional view of a rotary machine 10, such as a gas turbine engine, having a compression section 12. A portion of the compression section is shown in FIG. 1 and is partially broken away for clarity. The engine includes an axis of rotation Ar and an annular flowpath 14 for a stream of working medium gases. The annular flowpath extends axially through components of the compression section. These components include a rotor assembly 16 and a stator assembly 18 which extend circumferentially about the axis of rotation Ar.

The rotor assembly 16 includes a first rotor disk and blade assembly 22 and a second rotor disk and blade assembly 22d. Each rotor disk and blade assembly 22, 22d has a rotor disk 24, 24d and an array of rotor blades, as represented by the rotor blades 26, 26d. The rotor blades extend outwardly across the working medium flow path into proximity with the stator assembly. The second rotor disk and blade assembly 22d is spaced axially from the first rotor disk and blade assembly 22. This spacing leaves an annular opening 28 therebetween which is radially inwardly of the annular flowpath 14.

The rotor assembly 16 includes an annular seal member 32 which extends axially between the rotor disks 24, 24d to inwardly bound the annular opening 28. The annular seal member includes circumferentially extending projections, as represented by the knife edges 34, which extend radially outwardly into proximity with the stator assembly. The stator assembly 18 includes an annular seal land, as represented by the segment of the seal land 36. The annular seal land extends circumferentially about and in close proximity to the outwardly extending knife edges 34.

The stator assembly includes an outer flowpath wall 38 (outer case). The outer case outwardly bounds the annular flow path for working medium gases 14. The stator assembly includes an array of stator vanes, as represented by the stator vane 42, and a shroud assembly 44 which is supported by the array of stator vanes. The array of stator vanes 42 and the shroud assembly 44 extend inwardly from the outer case across the annular flowpath 14 into close proximity with the knife edges 34 of the rotor assembly.

The array of stator vanes 42 and the shroud assembly 44 are disposed downstream of the first rotor disk and blade assembly 22 and upstream of the second rotor disk and blade assembly 22d. Each stator vane has an outer end 46 and an inner end 48. An airfoil 52 extends across the flowpath between the ends. The airfoil is located in a predetermined manner with respect to the adjacent rotor blades 26, 26d for guiding the working medium gases from the upstream rotor blades 26 to the downstream rotor blades 26d. In the embodiment shown, the airfoils are rotatable about a spanwise axis S to adjust the angle of the airfoil to the approaching and departing stream of working medium gases. The shroud assembly includes a support 54 disposed therein for rotatably supporting the inner end 48 of the stator vane about the spanwise axis S.

The shroud assembly 44 extends into the annular opening 28 and circumferentially about the rotor assembly 16. The shroud assembly divides the annular opening into three cavities: a first annular cavity 56 extending between the shroud assembly and the first rotor disk and blade assembly 22; a second annular cavity 62 bounded by the shroud assembly; and, a third annular cavity 64 extending between the shroud assembly and the second rotor disk and blade assembly 22d. The shroud assembly includes the circumferentially extending seal land 36 as part of the shroud assembly. The knife edges 34 of the rotor assembly 16 and the seal land of the shroud assembly 18 cooperate to block the leakage of working medium gases from the working medium flowpath 14 through the first cavity 56 to the third cavity 64.

The shroud assembly 44 includes an outer annular member 66. An inner annular member 68 is spaced radially inwardly from outer annular member. The annular members radially bound the second cavity 62. The shroud assembly 44 has an upstream edge 70 and downstream edge 71. The support 54 for the rotatable stator vanes 42 extends circumferentially in the second cavity between the inner annular member and the outer annular member and is disposed between the edges. The support divides the second cavity into an upstream portion 72 having an upstream side 74 and a downstream portion 76 having a downstream side 78. The support has projections that extend into the second cavity, as represented by the nut and bolt fasteners (not shown in FIG. 1). The nut and bolt fasteners 79 are shown, for example, in FIG. 2A which is a perspective view, in part, showing an alternate embodiment 184 of the windage cover 84. As shown, the shroud assembly 44 has the inner and outer annular members 68, 66 and the support 54 extending between the members which receives the nut and bolt fasteners 79. These components are the same type of structure as shown in FIG. 1 with slight differences in structure to accommodate the different orientation and structure of the windage cover 184.

Referring to FIG. 1, the outer and inner annular members 66, 68 have tracks which adapt the shroud assembly to receive one or more windage covers. For example, the outer annular member 66 has a circumferentially extending track 80 adjacent the upstream side 74 of the second cavity 62 and a circumferentially extending track 80d adjacent the downstream side 78 of the second cavity. Similarly, the inner annular member has a circumferentially extending track 82 adjacent the upstream side 74 of the second cavity and a circumferentially extending track 82d adjacent the downstream side 78 of the second cavity.

The shroud assembly 44 includes at least one segmented windage cover, as represented by a segment of the upstream windage cover 84 and by a segment of the downstream windage cover 84d. Each windage cover extends circumferentially about the shroud assembly. Each windage cover overlays at least one side of the second cavity 62, such as the side 74 or the side 78. The windage covers shield projections, such as the nut and bolt fasteners 79, that extend into the second cavity from the swirling gases in the adjacent first cavity 56 or the adjacent third cavity 64. In this particular embodiment, the segmented windage covers are formed of at least two circumferentially extending segments.

The downstream windage cover 84d has structural elements that are similar to the upstream windage cover. The following description, which applies to the upstream windage cover 84, also applies to the downstream windage cover 84d. The same numerical reference indicia are used for those structural elements at or adjacent to the downstream windage cover that are similar to structural elements at the upstream windage cover. In addition, the reference indicia for these elements at the downstream windage cover include the letter "d." For example, the upstream windage cover has a base 88 which is similar to the base 88d of the downstream windage cover. FIG. 1 shows the windage cover 84 in the installed condition in full and, in phantom, shows the windage cover Mu in the uninstalled condition. FIG. 11 also shows the windage coverage in the uninstalled condition Mu.

Referring to FIG. 1 and FIG. 11, each segment of the upstream windage cover 84 has a U-shaped cross-sectional shape which is formed by the base 88 and two arms 96, 98. The base 88 extends circumferentially and radially to cover at least one of the sides of the second cavity 62, as represented by the side 74. The base has a first side, as represented by the outer side 90, and a second side, as represented by the inner side 92, which extend circumferentially about the base. The inner side is spaced from the outer side leaving a base member 94 which extends therebetween. In the present embodiment, the base and the arms of each segment of the windage cover are formed as one piece. An alternate embodiment might be formed of a segment of a first ring having an L-shaped cross-section for one arm and a segment of a second ring having the mirror image of an L-shaped cross-section for the second arm. Such an embodiment might have the arms joined, for example, at the bottom of the "L" to a base member having the form of an annular plate with the upright of the "L" shaped cross-section extending to form the arm.

The two arms 96, 98 of each segment of the upstream windage cover 84 include the first arm, as represented by the outer arm 96 and the second arm, as represented by the inner arm 98. As shown in FIG. 1, the outer arm and the inner arm in the installed condition are substantially perpendicular to the base 88 of the windage cover. Each arm extends from an associated side 90, 92 of the base in a generally axial direction to engage the annular members 66, 68 of the stator assembly and to position the base 88 over the second cavity. As shown in FIG. 11, the outer arm 96 of the windage cover has a first cover surface 102 which engages the outer annular member 66. The inner arm 98 has a second cover surface 104 which engages the inner annular member 68. In a like manner as shown in FIG. 1, the downstream segment of the windage cover 84d has the same elements denoted by the letter "d."

The outer and inner annular members 66, 68 of the stator assembly have damping surfaces 106, 108 which adapt the shroud assembly to engage the radially facing cover surfaces 102, 104 of the arms 96, 98. For example, the first damping surface 106 and the second damping surface 108 form a pair of damping surfaces adjacent to the upstream side 74 of the circumferentially extending second cavity 62. The first and second damping surfaces are spaced one from the other and face each other. The first damping surface 106 faces radially inwardly and extends circumferentially about the outer annular member 66. The second damping surface 108 faces radially outwardly and extends circumferentially about the inner annular member 68. In a like manner, the stator assembly 18 has a downstream first damping surface 106d and a downstream second damping surface 108d that adapt the shroud assembly to receive the downstream stream windage cover 84*d*. Thus, the downstream damping surfaces form a second pair of damping surfaces that are spaced one from the other and that face each other.

The uninstalled condition of the segment of the upstream windage cover 84*u* is shown in phantom in FIG. 1. In the uninstalled condition, the arms 96, 98 are spaced one from the other and angled one to the other such that the arms diverge as the arms extend in the axial direction. In the uninstalled condition, the first cover surface 102 is spaced from the second cover surface 104 by a maximum distance D. In the installed condition 84, the arms of the windage cover are deflected with respect to each other by engagement with the damping surfaces 106, 108 such that the installed maximum distance D' between said cover surfaces is different from and, in this case smaller than, the uninstalled distance D between the cover surfaces in the uninstalled condition. As a result, the cover surfaces of the arms press against the damping surfaces with a force that causes coulomb damping under operative conditions at the damping surfaces.

The windage covers 84, 84*d* are also fabricated such that the cover surface 102, 104 of each arm 96. 98 has a larger radius of curvature in the uninstalled condition than does the damping surface 106, 108 that is engaged by the associated cover surface. (The radii are measured at the location on the damping surface 106 or the cover surface 102 that is closest to the adjacent side 90 of the base 88 where the cover surface first engages the damping surface; or closest to the adjacent side 92 for the damping surface 108 or the cover surface 104). As a result, under operative conditions the differences in the radii of curvature between the damping surfaces and the arms in the uninstalled condition causes an increase in frictional forces between the damping surface and the cover surface and results in additional coulomb damping. For example, the first damping surface 106 of the outer annular member 66 has a radius of curvature Ro. The outer cover surface 102 on the outer arm 96 (first arm) in the installed condition has a radius of curvature Roai at the upstream side 90 (first side) of the base 88 that is equal to the radius of curvature Ro. However, the outer cover surface 102 in the uninstalled condition of the windage cover Mu has a radius of curvature Roau at the first side of the base that is a greater than the radius of curvature Roai.

Similarly, the inner damping surface 108 (second damping surface) on the inner annular member 68 has a radius of curvature Ri. The inner cover surface 102 (second cover surface) on the inner arm 98 in the installed condition has a radius of curvature Riai that is equal to the radius of curvature Ri at the second side 92 of the base 88. However, the inner cover surface 104 of the windage cover 84*u* in the uninstalled condition has a radius of curvature Riau at the second side of the base that is greater than the radius of curvature Riai.

Figure 2:
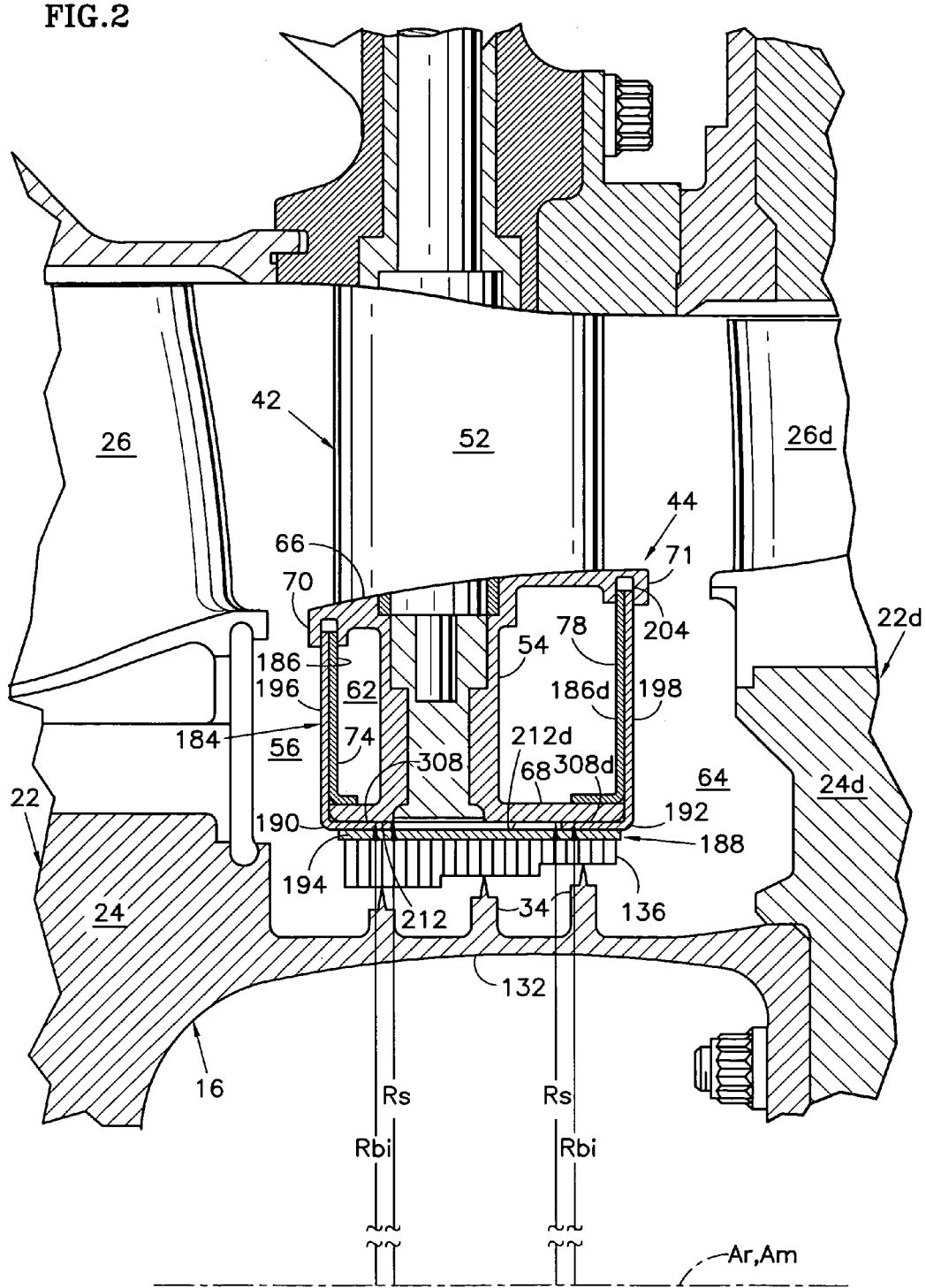
FIG. 2 is a side elevation, cross sectional view corresponding to the view in FIG. 1 and shows an alternate embodiment 184 of a segment of the windage covers 84, 84d shown in FIG. 1.
Figure 2A:
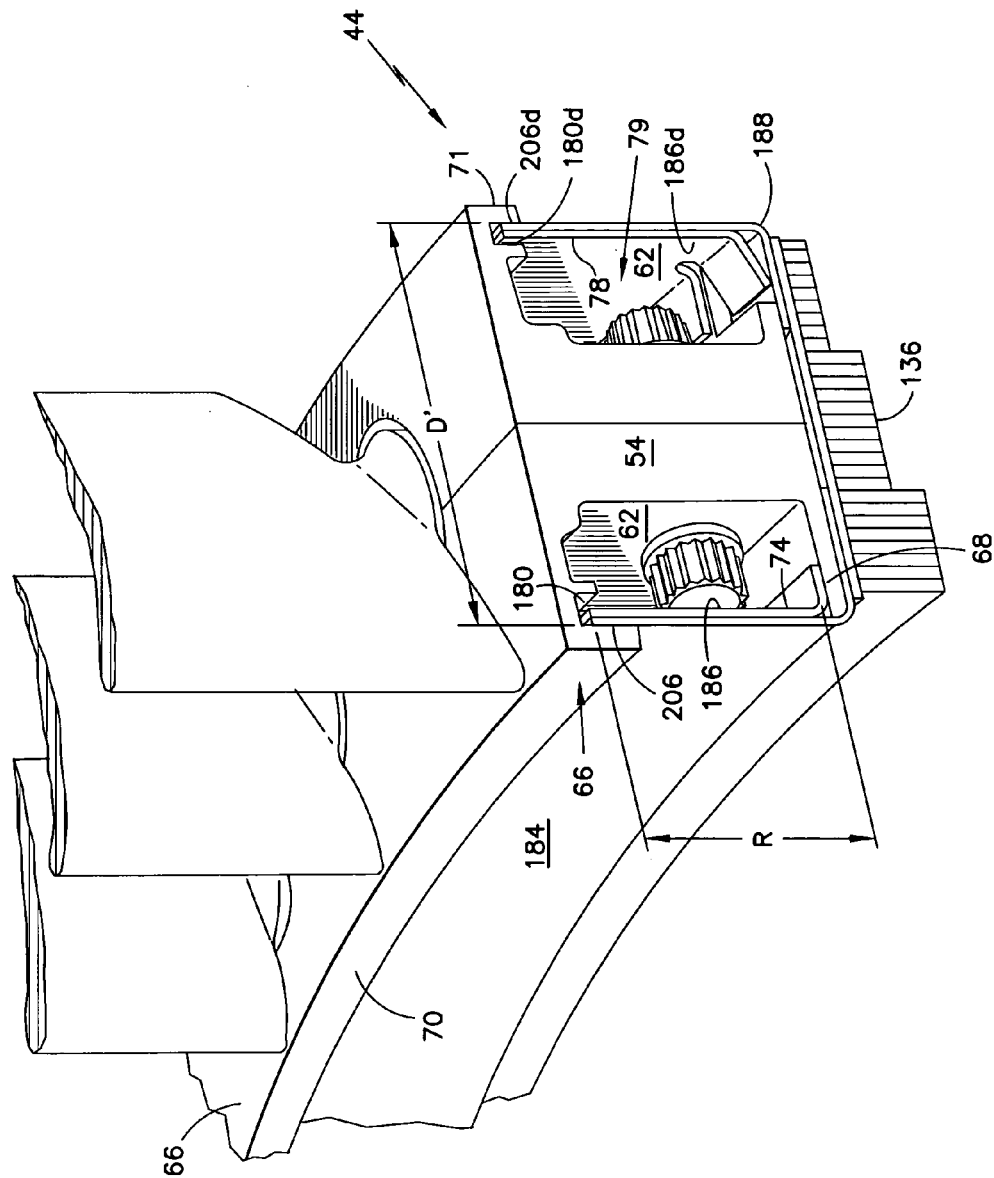
FIG. 2A is a simplified perspective view of a portion of the stator assembly shown in FIG. 2 showing the windage cover 184 and adjacent structure of the stator assembly 18.

FIG. 2 is a simplified side elevation, cross sectional view of a segment of the windage cover 184 which is shown in more detail in FIG. 2A and is an alternate embodiment of the windage covers 84, 84*d* shown in FIG. 1. The numerical reference indicia for elements of the windage cover 184 and selected elements of the shroud assembly that are engaged by the windage cover have numerical reference indicia that are increased by 100 from the reference indicia used in FIG. 1. Many elements of the compression section have the same reference indicia as FIG. 1 because the differences between embodiments lie in the design of the windage cover and in the different way of positioning the windage cover with respect to the remaining elements of the shroud assembly. Thus, the rotor assembly in FIG. 2 is the rotor assembly 16, the stator assembly in FIG. 2 is the stator assembly 18, and the windage cover in FIG. 2 is the windage cover 184 having arms 196, 198.

FIG. 2A is a perspective view of a portion of the stator assembly shown in FIG. 2 showing the circumferential ends of the outer annular member 66 and the inner annular member 68 and the windage cover 184 as the windage cover is being slid into position during assembly. FIG. 2A also shows adjacent structure of the stator assembly such as the stator vanes 42 and other structure of the shroud assembly 44. As shown in this view, the support 54 includes projections that extend into the second cavity, as represented by the nut and bolt fasteners 79, which are not shown in the view shown in FIG. 2.

Figure 2B:
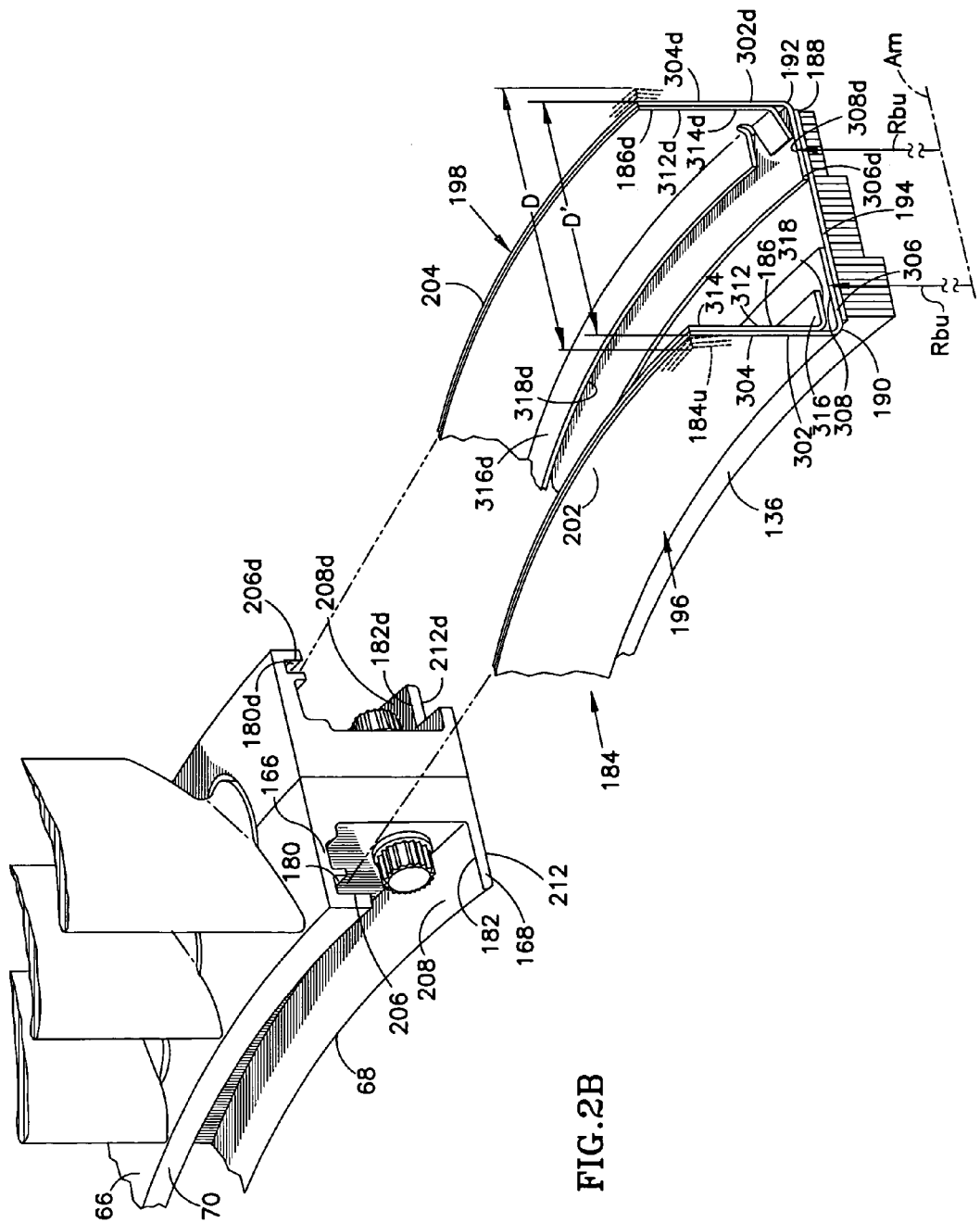
FIG. 2B is a simplified exploded, perspective view corresponding to the view shown in FIG. 2 during assembly of a segment of the windage cover 184u in the uninstalled condition to the shroud assembly 44.

FIG. 2B is a simplified exploded, perspective view corresponding to the view shown in FIG. 2A during assembly of a segment of the uninstalled windage cover 184*u* to the shroud assembly 44. The windage cover is shown in full with axial forces being exerted on the walls 196, 198 during installation to align the walls with tracks, as represented by the grooves 180, 180*b*, prior to circumferentially inserting the windage cover segment into the tracks. FIG. 2B also shows, in phantom, portions of the walls 196, 198 of the segment of the windage cover free of external forces in the uninstalled condition. Thus, FIG. 2B also shows in exaggerated fashion the diverging arms 196, 198 of the windage cover in the uninstalled condition 184*u*. The windage cover has a distance D which extends between the arms and a distance D' which extends between the arms in the installed condition. Assembly is accomplished by circumferentially sliding the windage cover segment 184*u* into tracks 180, 180*d* at the outer annular member 66 and tracks 182, 182*d* at the inner annular member 68 while slightly deflecting the arms 196, 198 toward each other.

Referring to FIG. 2, FIG. 2A, and FIG. 2B, the stator assembly 18 includes an annular seal land, as represented by the segment of the seal land 136. The annular seal land extends circumferentially about and in close proximity to the outwardly extending knife edges 34 of the rotor assembly. Unlike the seal land 36 of FIG. 1 which is attached directly to the inner annular member 68, the seal land 136 is attached to the windage cover 184 and, is in turn, supported and positioned by the inner annular member 68.

As noted above with respect to the windage covers 84, 84*d*, and as shown in FIG. 2A and FIG. 2B, for example, the outer annular member 66 and the inner annular member 68 have tracks, as represented by the grooves 180, 180*d*. The groove 180 is adjacent to the upstream side 74 of the second cavity 62. The circumferentially extending groove 180*d* is adjacent the downstream side 78 of the second cavity. Similarly, the inner annular member 68 has a circumferentially extending upstream track 182 adjacent the upstream side 74 of the second cavity and a circumferentially extending track 182*d* adjacent the downstream side 78 of the second cavity.

The windage cover 184 extends circumferentially about the shroud assembly 44. The windage cover has an upstream side 186 that overlays the upstream side 74 of the second cavity 62, and a downstream side 186*d* that overlays its downstream side 78. The windage cover shields projections that extend into the second cavity from the swirling gases in the adjacent first cavity 56 or the swirling gases in the adjacent third cavity 64 that are shown in FIG. 2. The projections are represented by the projections 79 in FIG. 2A. The segmented windage cover 184 may be formed of at least two circumferentially extending segments. As shown in FIG. 3 for this particular embodiment, the windage cover is formed of four circumferentially extending segments. Similarly, the inner annular support member 68 may be formed of at least two segments and, as shown, the outer annular support member 66 is formed of four segments.

As shown in FIG. 2, FIG. 2A, and FIG. 2B, the windage cover 184 has a U-shaped cross-sectional shape which is formed by the base 188, the first, upstream arm 196 having the upstream side 186 of the windage cover; and, the second, downstream arm 198 having the downstream side 186d of the windage cover. The base 188 is a segmented ring which extends circumferentially and which engages the inner annular member 68. The base has a first side, as represented by the upstream side 190, and a second side, as represented by the downstream side 192, which extend circumferentially about the base. The sides 190, 192 are closely adjacent to the sides 186, 186d of the windage cover. Each arm extends from the associated side 190, 192 of the base in a generally radial direction. The upstream arm 196 and the downstream arm 198 in the installed condition are substantially perpendicular to the base 188 of the windage cover 184.

As shown in FIG. 2B, the upstream side 190 of the base 188 is spaced axially from the downstream side 192 leaving a base member 194 which is disposed therebetween. In the present embodiment, the base of the windage cover includes the bottom flanges of two rings: an upstream ring 302 having an L-shaped cross-section formed by an upright 304 and a shorter bottom flange 306; and, a downstream ring 302d having a cross-section which is the mirror image of an L-shaped cross-section. The cross-section of the downstream ring is formed by an upright 304d and a shorter bottom flange 306d.

The base is formed by attaching the base member 194 to the bottom upstream flange 306 of the upstream ring 302 and the bottom downstream flange 306d of the downstream ring 302d. An alternate embodiment might be formed of one piece by using a cylindrical base member 194 coextensive with the base 188 and handing additional axial width. The arms of the windage cover arm are formed by bending the additional material away from the base until the arms extend radially. Such a construction may be formed, for example, by a rolling mill.

Figure 12:
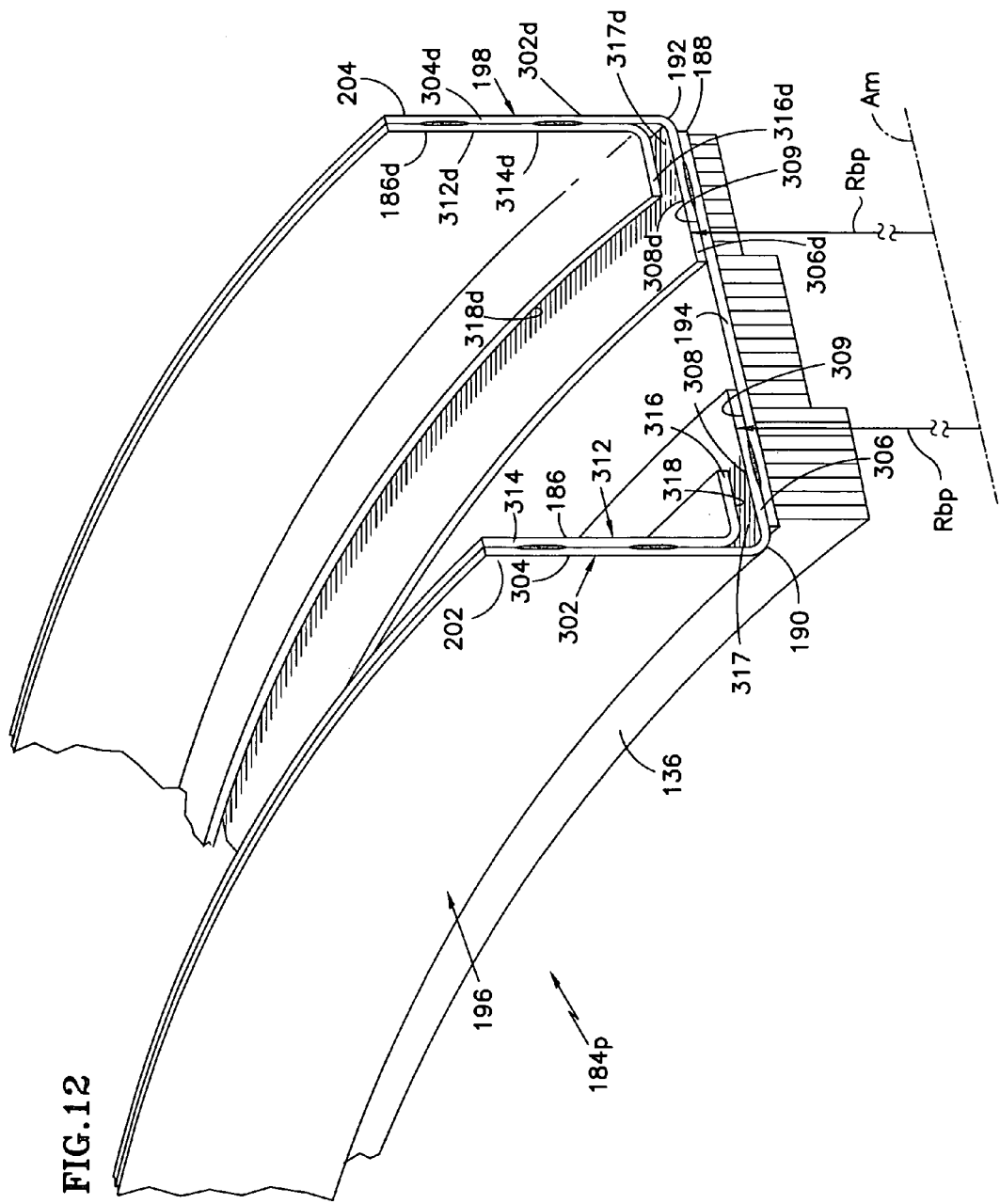

As discussed in more detail with respect to FIG. 12, the rings 302, 302d cooperate with a pair of associated rings 312, 312d. The associated rings 312,312d have a larger inner diameter and cooperate to form the arms and retention flanges. The rings 312, 312d have matching retention flanges 316, 316d spaced radially from the base flanges 306, 306d leaving annular channels 317, 317d therebetween. The channels adapt the windage cover to engage the inner annular member 68. The arm 196 is formed with an upright 314 cooperating with the upright 304 and the arm 198 is formed with an upright 314d cooperating with upright 304d. Thus, in the assembled condition, the first base flange 306 and second arm flange 316 extend from the upstream arm in the axial, downstream direction. The third and fourth flanges 306d, 316d extend from the downstream arm in the axial, upstream direction and face the first and second flanges.

Each arm is positioned over the second cavity by the base 188 and by the arm flanges 316, 316d engaging the inner annular member. Each arm also engages the outer annular members 66 of the stator assembly 18. In particular, the upstream arm 196 of the windage cover has a first, upstream outer cover surface 202 which engages the outer annular member 66. Similarly, the downstream arm 198 has a second, downstream outer cover surface 204 which also engages the outer annular member 66.

As mentioned, the FIG. 2 embodiment also has windage cover surfaces that engage the inner annular member 68. The inner annular member 68 is engaged by cover surfaces on the base flanges 306, 306d and by cover surfaces on the second and fourth arm flanges 316, 316d. In particular, the first upstream flange 306 has a third, upstream base cover surface 308 and the third, downstream stream flange 306d has a third, downstream base cover surface 308d. The second, upstream arm flange 316 has a fourth, upstream cover surface 318 and the fourth, downstream stream arm flange 316d has a fourth, downstream cover surface 318d.

As shown in FIG. 2A and FIG. 2B, the outer annular member 66 and inner annular member 68 of the stator assembly 18 have damping surfaces that adapt the annular members to engage the windage cover surfaces. A first damping surface 206 faces axially downstream and the second damping surface 206d faces axially upstream toward the first damping surface. The damping surface 206 engages the radially extending cover surface 202 on arm 196, and the damping surface 206d engages the radially extending cover surface 204 on the arm 198. The cover surfaces and damping surfaces are substantially parallel in the installed condition. The first damping surface 206 is disposed adjacent to the upstream side 74 of the circumferentially extending second cavity 62. The second damping surface 206d is disposed adjacent to the downstream side 78 of the circumferentially extending second cavity 62. Accordingly, the first and second damping surfaces are a pair of damping surfaces that are spaced one from the other and that extend circumferentially about the outer annular member 66.

The shroud assembly 44 has other damping surfaces that face radially for engaging associated cover surfaces. For example, the annular inner member 68 has third upstream and downstream base damping surfaces 212, 212d which face inwardly. The base damping surfaces 212, 212d engage the windage cover surfaces 308, 308d on the base flanges 306, 306d. The annular inner member 68 has fourth upstream and downstream flange damping surfaces 208, 208d that face outwardly and engage the windage cover surfaces 318, 318d on the axial arm flanges 316, 316d.

As mentioned earlier, FIG. 2B shows in full the segment of the windage cover 184 during the installation condition with the arms compressed to alignment in the arms with the grooves 180, 180d. FIG. 2B also shows in phantom the segment of the upstream windage cover 184u in the uninstalled condition free of external forces. In the uninstalled condition, the arms 196, 198 are spaced one from the other and angled one to the other such that the arms diverge as the arms extend in the radial direction. In the uninstalled condition, the first cover surface 202 is axially spaced from the second cover surface 204 by a maximum distance D. In the installed condition 184, the arms of the windage cover are deflected with respect to each other by engagement with the damping surfaces 206, 206d such that the installed maximum distance D' between said cover surfaces is different from and, in this case, smaller than the uninstalled distance D between the cover surfaces in the uninstalled condition. As a result, the cover surfaces of the arms press against the damping surfaces with a force that causes coulomb damping at the damping surfaces. As will be realized an alternate embodiment might have the arms inclined toward each other, with the first and second damping surfaces being the adjacent surfaces of the grooves 180, 180d facing axially, but facing axially away from each other with the distance D in the uninstalled condition being smaller than the distance D' in the installed condition.

The windage cover 184 is designed in a fashion similar to the windage covers 84, 84d to cause a slight mismatch in radii of curvature between radially facing cover surfaces of the windage cover and the associated damping surfaces on the annular members 66, 68. For example, the third cover surfaces 308, 308*d* of the base have a larger radius of curvature in the uninstalled condition than does the inner surface of the annular member 68 (third damping surfaces 212, 212*d*) that is engaged by the base. As a result, under operative conditions the differences in the radii of curvature between the damping surfaces and the arms in the uninstalled condition causes an increase in frictional forces between the damping surface and the cover surface and results in additional coulomb damping. As shown in FIG. 2 by way of illustration, the third damping surface 312, 312*d* of the inner annular member 68 has a radius of curvature Rs. In the installed condition, the third cover surfaces 308, 308*d* on the base have radii of curvature Rbi that are nearly equal to the radius of curvature Rs. However, as shown in FIG. 12, the third cover surfaces 308, 308*d* of the base in the uninstalled condition of the windage cover 184*u* have radii of curvature Rbu that are greater than the radius of curvature Rbi on the base in the installed condition and the radius of curvature Rs of the third damping surfaces on the inner annular member 68.

FIG. 3 is a simplified cross-sectional view taken perpendicular to the axis of rotation Ar with elements of the compression section broken away for clarity. FIG. 3 shows the four segments of the windage cover and the four segments of the seal land 136, that are attached to the windage cover 184. As discussed earlier, the windage cover has an upstream arm 196 which engage the outer annular member 66 of the shroud assembly 44.

The windage covers 84, 84*d* and 184 bounding said at least one side of the second cavity 62 and facing, for example, the first cavity 56 or the third cavity 64 are each formed of sheet metal having at least one layer of sheet metal and having a total thickness of all layers that is less than about ninety mils (ninety thousandths of an inch or about twenty-three hundred micrometers). The material for the layers of the windage cover are typically alloys. One particular family of alloys found satisfactory are nickel based super alloys such as the Inconel® family of materials provided by the Special Metals Corporation. One particular alloy known to be suitable is described as Aerospace Material Specification (AMS) 5599 material. An example of such material is Inconel® 625 material. Other suitable materials are AMS 4919 (Ti-6-2-4-2) and AMS 4911 (Ti-6-4). The material may be worked, for example, by hot forming or cold forming using rolling mills.

As discussed earlier, a particular advantage is the relatively lightweight of the windage cover while still providing adequate damping to itself through coulomb friction. In addition, the ratio of the relative thickness of the windage cover to its radial height and in other embodiments to its radial height and area enables viscous friction to dissipate vibrations induced by pressure pulses of the adjacent cavities. This results because the pressure pulses of the adjacent cavities causing slight deflections of portions of the windage cover structure bounding the second cavity and extending to bound the adjacent cavities. The vibrations of the windage cover adjacent the cavities, in turn, act upon gases in the second cavity and the adjacent cavities. Thus, the design uses the vibrations themselves to cause vibrational energy to be just dissipated by fluid friction. This results from the adjacent gases in the second cavity resisting the forces of the gases in the first and third cavities by a force proportional to the velocity of the deflections of the windage cover and in a direction opposite to the direction of movement of the windage cover. In the particular embodiments shown in FIG. 1, the windage cover has a radial height R for the upright portion of the windage cover, such as for the uprights 304,314, bounding said at least one side of the second cavity. The windage cover has an average axial thickness T for the portion bounding both the second cavity and the adjacent cavity. The ratio R/T is greater than eighteen (R/T>18) such that pressure pulses from the gases in the adjacent first cavity cause the windage cover to move against the gases in the second cavity and through fluid friction, to viscously damp vibrations in the windage cover.

Portions of the windage cover bounding the cavities shown are in the form a sheet-like structure when comparing the relative thickness of the portion to its area. For example, in the embodiments shown in FIG. 1 and FIG. 2, the windage cover might have a ratio of radial height R to thickness T that is greater than eighteen (R/T>18); and also might have an area A facing the second cavity for the portion having the radial height R, a ratio of area A to the thickness T that is greater than fifteen hundred (A/T>1500). Experimental testing has shown that such a thin, flat sheet will accommodate the vibrations that are induced in the structure under operative conditions.

There are several satisfactory methods for forming a windage cover. One method of forming the segments might include the step of cutting precursor segments of the windage cover from a relatively flat, piece of material, and then bending the edge or edges of the segments to form the structure having the cover surfaces 106, 108 on windage cover 84 or the cover surfaces 206, 206*d* on the windage cover 184. The bending of the arms, such as arms 96, 98, 196, 198, to cause the arms to diverge might take place after forming the segments. In the method of forming the segments of the windage cover 184, this would require assembling and attaching the individual parts of each segment of the rings together four times to form each of the four segments in completed form for the windage cover 184.

FIGS. 4-12 relate to another method of forming the windage covers 84, 84*d*, 184 that has advantages over the method discussed above for forming the windage cover. In particular, the methods for forming the windage cover 84, 184 discussed below include the following two groups of sequential steps, that is: a first group which are the steps for forming as a complete ring, a ring precursor having parts of the windage cover that engage the annular members 66, 68 of the shroud assembly 44. The ring precursor has these parts in position with respect to each other and attached together. This group of steps is performed prior to performing the second group of steps. The second group of steps are those that cut the precursor rings of the windage covers 84*p*, 84*dp*, 184*p* into segments to form the segments of the windage cover. In one detailed method of forming the windage cover 184, the steps include attaching all of the rings together that have parts that engage the annular members 66, 68 prior to cutting the rings into segments.

As noted above, each segment of the windage covers 84, 84*d*, 184 has a cross-sectional shape which includes a circumferentially extending base 88, 188. Each base has a first side 190, 192 which extends circumferentially about the base and at least one arm, 196, 198 extending from the first side which is substantially perpendicular to the base in the installed condition. For example, windage cover 84 has arms 96, 98; and, windage cover 184 has arms 196, 198.

Figure 4:
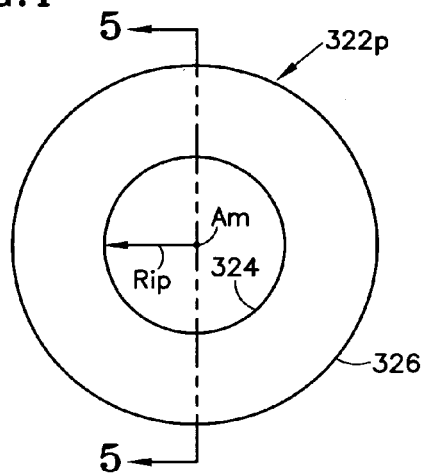
Figure 5:
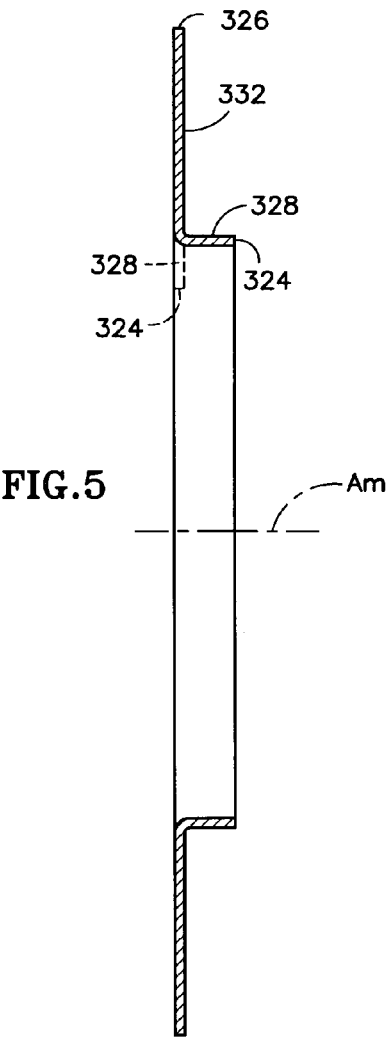

FIG. 4-7 shows by the use of a single ring precursor 322*p* an important physical aspect of a segment of a windage cover that results from forming a windage cover with the two groups of steps. In particular, FIG. 4 shows a front view of a sheet of annular material extending about and perpendicular to an axis Am, as represented by the ring precursor 322*p* for part of an annular windage cover 322. FIG. 5 is a cross-sectional view taken along the line 5-5 of FIG. 4 with the phantom lines showing a portion 328 of the sheet prior to bending that portion of the sheet. Prior to bending a portion of the sheet, the ring has an inner diameter edge 324 and an outer diameter edge 326. The portion of the sheet is bent to form a flange 328 leaving the remainder as a rim 332.

Figure 6:
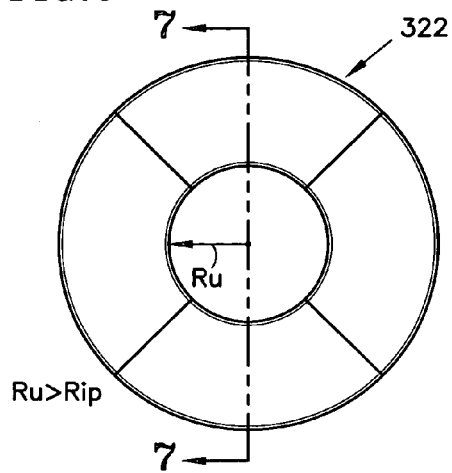
Figure 7:
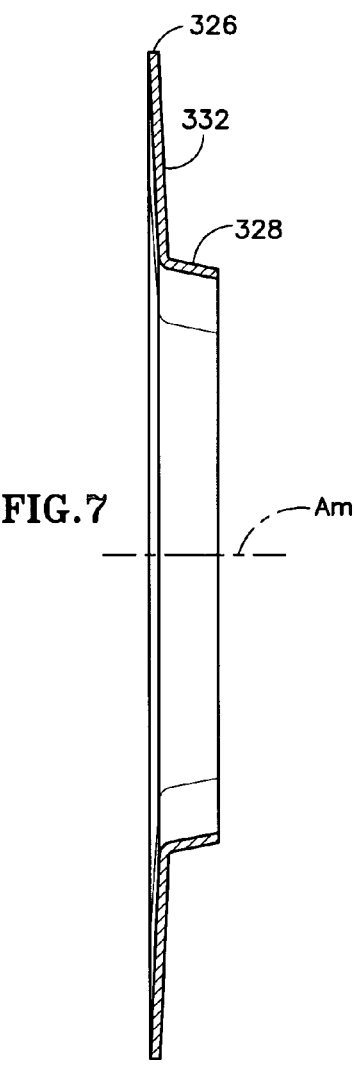

FIG. 6 is a view corresponding to the view shown in FIG. 4; and, FIG. 7 is a view corresponding to the view shown in FIG. 5 showing the continuous ring precursor 322*p* after the step of cutting the continuous ring into four segments to form the ring 322 for part of a windage cover. The stresses induced in the ring precursor 322*p* by the forming process cause each segment 322 to have a slightly greater radius of curvature Ru than the radius of curvature Rp of the ring precursor and causes the rim 332 and the flange 328 of the segment to be angled more with respect to the axis Am. As a result, the structure diverges from the location the structure will have in the installed condition.

The method of forming the windage cover includes steps comprising: forming a continuous ring from a sheet of annular material extending about and perpendicular to an axis Am, the sheet having an inner diameter edge 324 (as shown in full and by the phantom lines in FIG. 5) and an outer diameter edge 326. The sheet is relatively flat. The completion of the step of bending the inner diameter edge and a portion of the continuous ring adjacent to the inner diameter edge more parallel to the axis Am is shown in FIG. 5. The bending might be done in a rolling mill and is done such that the ring has an annular inner flange 328 at the inner diameter and a rim 332 which extends from the flange to the outer diameter edge 326. The inner flange is formed substantially perpendicular to the rim and parallel to the axis Am. The method also includes the step of cutting the ring to form at least two arcuate segments, and as shown, forms four arcuate segments.

As noted above, the sheet used to form the continuous ring is relatively flat. The term "relatively flat" as used herein means that, prior to forming the flange, the elevation of one part of the surface of the sheet with respect to other parts of the surface is less than twice the height of the largest flange that is formed by the step of bending the material.

FIG. 8 shows a front view of an annular windage cover precursor 84*p* extending about and perpendicular to an axis Am. FIG. 9 is a cross-sectional view taken along a line 9-9 of FIG. 8 with the phantom lines showing a portion of the sheet prior to bending the portion of the sheet. FIG. 10 is a view corresponding to the view shown in FIG. 8 of the completed windage cover 84 and FIG. 11 is a view corresponding to the view shown in FIG. 9, with FIG. 10 and FIG. 11 both showing the completed windage cover after the step of cutting the precursor windage cover into four segments. The windage cover has a base 88 having a first side 90 and a second side 92, a first arm 96 extending from the first side and a second arm 98 extending from the second side.

The step of forming the inner flange 328 of the ring precursor 322*p* as shown in FIG. 4 and FIG. 5 adapts the method to form a first flange corresponding to the arm 98 which extends from a side of the base and to use the first flange to form the arm 98 in the finished condition of the windage cover 84. The step of forming at least a portion of the rim 332 of the ring precursor 322 adapts the method to form at least a portion of the base with the base extending between the sides in the finished condition of the windage cover 84. The method may also include bending the rim to form the frustoconical section of the base or the relatively flat ring may have the frustoconical section already formed.

Prior to the step of cutting the ring, the method of forming the windage cover 84 also includes the step of bending the outer diameter edge and a portion of the ring 84*p* adjacent to the outer diameter edge as was shown for the inner diameter edge of the ring precursor 322 in FIG. 4 and FIG. 5. This portion of the rim is bent more parallel to the axis Am such that the ring has an annular outer flange or arm 96 and the rim extends from the inner flange to the outer flange to form the base 88, with the flanges (arms 96, 98) being substantially perpendicular to the rim and parallel to the axis Am. The annular outer flange adapts the ring to form the outer arm 96*p* of the windage cover precursor 84*p* leaving the base precursor 88*p* therebetween. The windage cover precursor 84*p* extends about the axis Am and has a radius Roap to the outer arm 96 and a radius of Riap to the inner arm 98. The radius Roap to the outer arm 96 is equal to the radius Ro to the first damping surface and the radius Riap to the inner arm 98 is equal to the radius to the second damping surface Ri. Thus, the windage cover precursor 84*p* is formed to the radii Roai and Riai that it will have in the installed condition and are equal respectively to the radii Ro, Ri of the damping surfaces.

Upon cutting the windage cover precursor 84*p* into segments, the stresses induced in the ring (windage cover precursor 84*p*) by the forming process, cause each segment to have the slightly greater radii of curvature Roau and Riau of the uninstalled condition Mu which are greater than the radii of the windage cover precursor 84*p*. In addition, the stresses cause the arms of the segment to be angled more with respect to the axis Am as was shown in FIG. 7 for the ring 322. This in turn causes the arms to diverge from the location the structure will have in the installed condition. As a result, the arms of the segment of the windage cover diverge more away from each other as the arms extend from the base than do the same arms prior to the step of cutting the ring. This causes the distance D between the arms in the uninstalled condition to be greater than the distance D' which is the distance between the arms in the installed condition discussed above.

FIG. 12 is a partial perspective view partially broken away and sectioned, of the windage cover precursor 184*p* for the windage cover 184 prior to cutting the precursor into four segments. The windage cover precursor has the same radii to windage cover surfaces (which engage the inner and outer annular members 66, 68 for damping) that the cover surfaces will have in the installed condition. The windage cover precursor 184*p* is cut by a sectioning plane containing the axis Am. shown in FIG. 2 and FIG. 2B. FIG. 2B shows the segment of the windage cover 184*u* in the uninstalled condition after being segmented. In this view, the segment of the windage cover is being inserted into the grooves 180,180*d*. This requires pressing the arms toward each other to ensure the distance between the arms is the distance D' as the segment of the windage cover is installed in the grooves.

The windage cover precursor 184*p* is a circumferentially extending ring formed of the four rings 302,302*d*,312,312*d* discussed above. Each of the rings is formed as a circumferentially continuous ring using the method shown in FIG. 4 and FIG. 5. As noted above, the perspective view in FIG. 12 is partially broken away with section lines eliminated to show more clearly the relationship of the rings to each other and to the material used to attach the rings together, such as by brazing using a suitable braze material.

The method of forming the windage cover precursor 184 uses the ring 302 and the method for forming the ring is shown in and discussed with respect to FIG. 4 and FIG. 5. As shown in FIG. 12, the first ring 302 has the first flange 306 having the axially oriented outer surface 308 and an axially oriented inner surface 309. The method also includes the steps of forming the second ring 312 having a second flange 316 in the same fashion as the flange on the first ring. The second flange of the second ring has a greater diameter than the first flange of the first ring. The method includes disposing the rings about the axis Am such that the second flange of the second ring is spaced radially from the first flange of the first ring leaving the annular channel 317 therebetween. The steps include forming a third ring 302d in the same fashion as the first ring, the third ring having a third flange 306d which has an axially oriented inner surface 309d; and forming a fourth ring 312d in the same fashion as the second ring 312, the fourth ring having a fourth flange 316d. The third and fourth flanges 306d, 316d are oriented to face the first and second flanges 306, 316 on the first and second rings in the installed condition. Thus, the steps include disposing the third and fourth rings 302d, 312d about the axis Am such that all rings have the same axis Am and the third and fourth flanges 306d, 316 form an annular channel 317d for the third and fourth rings that axially faces the annular channel 317 of the first and second rings.

Further steps include disposing a circumferentially extending base member 194 about the axis Am. The base member engages the inner surface 309 of the first flange 306 of the first ring and the inner surface 309d of the third flange 316 of the third ring 302d; attaching the first and second rings 302, 312 together; attaching the third and fourth rings 302d,312d together; attaching the base member 194 to the inner flange 306 of the first ring and the inner flange 306d of the third ring to form the base 188. The preceding steps may be performed in any order and the base member need not be a circumferentially continuous ring. After completing the foregoing steps, the method includes cutting the first, second, third and fourth rings and the base along a plane containing the axis Am.

As noted above, brazing is one satisfactory method for attaching the rings together, and for attaching the rings and base member. The method might also include attaching the seal land to the rings prior to cutting the rings. The radius of curvature Rbp of the third cover surfaces of the base in the precursor 184p is equal to the radius of curvature of the third damping surfaces of the inner annular member Rs. As with the windage cover 84 shown in FIG. 1, upon cutting of the rings, the arms 196,198 diverge due to the induced stresses in the ring during the forming process and the segments move to the greater radius of curvature Rbu that the segments have in the uninstalled condition.

The method of forming a windage cover discussed above with respect to FIG. 4-12 provides several advantages during assembly and for the product which is produced by the method. For example, in the embodiment shown in FIG. 2, joining two rings together, such as the first ring 302 and second ring 312, positively locates the rings with respect to each other and need only be done once prior to forming the segments. If done after forming the segments, each segment of the ring must be separately located as each segment of the windage cover is formed. The present method simplifies and facilitates the assembly process, reducing cost and material handling time. As discussed above, all rings may be positively located with respect to each other prior to cutting the rings. The segment of the windage cover 84 shown in FIG. 1 has the outer arm 96 positively located with respect to the inner arm 98 on a particular segment and also each arm is in circumferential alignment with respect to adjacent segments. This is also true of the adjacent segments for the construction of the windage cover 184 shown in FIG. 12. In one particular embodiment, an advantage of the windage cover which is produced by the process is the circumferential alignment of adjacent seal land segments in the installed condition which are attached to the segments of the windage cover precursor 184p prior to cutting the precursor to form the segments.

Finally, the method of forming the windage covers by bending portions of the windage cover precursor 84p, 184p which are in the form of complete rings prior to cutting the segments has advantages in providing coulomb damping as discussed above. In particular, this causes the arms to diverge and the radius of curvature of the segments to increase as compared to the installed condition. A spring fit is made possible by the relative dimensions of thickness and length of the base and arms for the windage covers and provides a damping force as discussed above without further bending of the segments after cutting the windage cover precursor 84p, 184p to form the segments. The divergence of the arms is exaggerated for purposes of illustration in the drawings and is typically less than about five degrees. The increase in the radius of curvature is also exaggerated and is typically less than two percent of the radius of curvature. Higher values may be warranted depending on a particular construction and need for damping.

During operation of the rotary machine 10, the stream of working gases passes through the rotor blades 26, 26d and through the stator vanes 42 along the annular flow path 14. As discussed earlier, the high rotational speed of the rotor disk and blade assemblies 24, 24d cause regions of high velocity swirling gases to form in the first cavity 56 and third cavity 64 adjacent to the second cavity 62. As these gases contact structure extending into the cavity, they lose energy to the projections causing wasteful heating of components that extend into the cavity. This energy is replaced by taking energy (that is, a loss of energy) from the rotating components. Thus, an advantage is the efficiency of the rotary machine which results from bounding the first cavity and third cavity with a relatively smooth boundary that is provided without bolts, for example, protruding into the cavity to hold the windage cover. In addition, the efficiency of the machine benefits from the reduced volume of swirling gases in the adjacent first cavity and third cavity by providing windage covers at the upstream side 74 and downstream side 78 of the second cavity adjacent to the edges 70, 70d of the shroud assembly 44. Reducing the volume of these cavities reduces the mass of the swirling gases that are pulled along by the rotating structure as compared to structures that do not have the windage covers close to the upstream edge and downstream edge of the shroud assembly.

The structure is relatively lightweight as compared to structures that are formed of relatively thick windage covers that are bolted in place and that are heavier than the boltless construction for the windage cover that is shown. Reduced fabrication costs result from using thin structures that may be formed in a rolling mill as compared to heavier constructions that must be cast or machined to form the contours of the windage cover and then drilled to attach the windage cover to the stator structure.

Another advantage is the durability of the windage cover even though it is relatively lightweight and formed of relatively thin material. The durability results from decreasing vibrational stresses in the windage cover by damping vibrations in the windage cover. In one particular embodiment, the damping of vibrations results from using both coulomb friction and viscous friction to damp vibrations in the windage cover. In one detailed embodiment, damping by viscous friction results from forming the windage cover of relatively thin sheet metal material which permits deflections of the walls of the windage cover in response to operative forces from gases in the cavities adjacent to the windage cover. Thus, the characteristic of its thinness and flexibility that reduces weight but makes vibrations a concern acts to reduce those vibrations by providing viscous damping.

An advantage in the detailed embodiments shown in FIG. 1 and FIG. 2 is the durability of the rotary machine which results from trapping with the windage cover any structure which might become loose in the second cavity 62, such as the nut and bolt fasteners 79. As will be appreciated, these items may become liberated during engine operation and enter the flow path causing damage to the rotating structure and stator structure of the machine Although the invention has been shown and described with respect to detailed embodiments thereof, it should be understood by those skilled in the art that various changes in form and detail may be made without departing from the spirit and scope of the claimed invention.

We claim:

1. A method of forming a windage cover for a rotary machine. the rotary machine having a cavity and at least one damping surface adjacent the cavity, the windage cover for covering at least one side of the cavity in the rotary machine, the windage cover having the form of a ring with at least two circumferentially extending segments that extend about an axis Am and engage a damping surface, each segment having a cross-sectional shape which includes a circumferentially extending base, the base having a first side which extends circumferentially about the base and at least one arm extending from the first side which is substantially perpendicular to the base, including the steps comprising:

forming a continuous ring precursor that extends about an axis Am from a continuous sheet of annular material, the sheet of annular material extending about and in a direction perpendicular to the axis Am, the sheet having an inner diameter edge and an outer diameter edge, wherein the step of forming the continuous ring precursor further includes bending the inner diameter edge and a portion of the continuous sheet adjacent to the inner diameter edge more parallel to the axis Am such that the ring precursor has an annular inner flange at the inner diameter having a radius of curvature with respect to the axis Am and has a rim which extends from the flange to the outer diameter edge, at least a portion of the rim extending about and in a direction perpendicular the axis Am, the inner flange being substantially perpendicular to the rim and parallel to the axis Am for engaging the damping surface;

cutting the continuous ring precursor to form at least two arcuate segments of the windage cover;

wherein stresses induced in the ring precursor by the process of forming the ring precursor cause each segment of the windage cover to have an inner flange having a greater radius of curvature with respect to the axis Am than the inner flange of the ring precursor and causes the flange of the segment of the windage cover to be angled more with respect to the axis Am than the flange of the ring precursor.

2. The method of forming a windage cover of claim 1 wherein the step of bending the inner diameter edge and a portion of the continuous sheet forms the inner flange of the continuous ring precursor which provides an arm for the segments of the windage cover and forms at least a portion of the rim which provides a portion of the base for the segments of the windage cover.

3. The method of forming a windage cover of claim 2 wherein the windage cover has a second side which extends circumferentially about the base and which is spaced from the first side leaving the base therebetween and wherein the steps of the method include prior to cutting the ring, the step of bending the outer diameter edge and a portion of the ring adjacent to the outer diameter edge more parallel to the axis Am such that the ring has an annular outer flange and the rim extends from the inner flange to the outer flange, the flanges being substantially perpendicular to the rim and parallel to the axis Am.

4. The method of forming a windage cover of claim 2 wherein the rim of the continuous ring precursor provides a portion of the base for the segments of the windage cover, wherein the arm of the windage cover is a first arm extending from the base, wherein the step of forming the continuous ring precursor further includes bending the outer diameter edge and a portion of the continuous sheet adjacent to the outer diameter edge more parallel to the axis Am such that the continuous ring precursor has an annular outer flange at the outer diameter having a radius of curvature with respect to the axis Am, the outer flange providing a second arm extending from the base for the segments of the windage cover, and wherein the first and second arms of the segments of the windage cover diverge more away from each other as the arms extend from the base than do the inner and outer flanges of the continuous ring precursor prior to the step of cutting the continuous ring precursor.

5. The method of forming a windage cover of claim 1 wherein the continuous ring precursor is a first ring and the inner flange is a first flange having an axially oriented inner surface and wherein prior to cutting the first ring, the method includes the steps of forming a second ring having a second flange in the same fashion as the first ring, the second flange of the second ring having a greater diameter than the first flange of the first ring;

disposing the rings about the axis Am such that the second flange of the second ring is spaced radially from the first flange of the first ring leaving an annular channel therebetween;

forming a third ring in the same fashion as the first ring, the third ring having a third flange which has an axially oriented inner surface and a forming a fourth ring in the same fashion as the second ring, the fourth ring having a fourth flange which are oriented to face the first and second flanges on the first and second rings in the installed condition;

disposing the third and fourth rings about the axis Am such that all rings have the same axis Am and the third and fourth flanges form an annular channel for the third and fourth rings that axially faces the annular channel of the first and second rings;

disposing a circumferentially continuous base member about the axis Am which engages the inner surface of the first flange of the first ring and the inner surface of the third flange of the third ring; attaching the first and second rings together; attaching the third and fourth rings together; attaching the base member to the inner flange of the first ring and the inner flange of the third ring to form the base;

cutting the first, second, third and fourth rings and the base along a plane containing the axis Am.

6. The method of forming a windage cover of claim 5 wherein the step of attaching the rings and base members includes brazing the rings and base members.

* * * * *